United States Patent
Gerosa

(10) Patent No.: US 9,180,589 B2
(45) Date of Patent: Nov. 10, 2015

(54) DROP AND DRIVE TOOL

(71) Applicant: Randal Gerosa, Elm Grove, WI (US)

(72) Inventor: Randal Gerosa, Elm Grove, WI (US)

(*) Notice: Subject to any disclaimer, the term of this patent is extended or adjusted under 35 U.S.C. 154(b) by 0 days.

(21) Appl. No.: 14/516,904

(22) Filed: Oct. 17, 2014

(65) Prior Publication Data

US 2015/0107054 A1 Apr. 23, 2015

Related U.S. Application Data

(60) Provisional application No. 61/892,812, filed on Oct. 18, 2013.

(51) Int. Cl.
| | | |
|---|---|---|
| *B25G 1/00* | (2006.01) | |
| *B25G 1/10* | (2006.01) | |
| *F16B 39/12* | (2006.01) | |
| *B25G 3/36* | (2006.01) | |

(52) U.S. Cl.
CPC ........ *B25G 1/102* (2013.01); *B25G 3/36* (2013.01); *F16B 39/12* (2013.01)

(58) Field of Classification Search
CPC ........ Y10T 16/476; B25G 1/00; B25G 1/102; B25G 1/10; A46B 5/02; A46B 5/021; A46B 5/016; A01B 1/06; A01B 1/08
USPC ................. 16/430, 429, 436, 426, DIG. 40, 16/DIG. 41; 15/143.1, 144.4; 294/49, 57, 294/58; D8/10, 11; D32/46, 48, 49, 47, 51, D32/52
See application file for complete search history.

(56) References Cited

U.S. PATENT DOCUMENTS

| | | | | | |
|---|---|---|---|---|---|
| 2,710,571 | A | * | 6/1955 | Pfister | 172/378 |
| 3,143,984 | A | * | 8/1964 | Morasch | 111/7.1 |
| 3,381,763 | A | | 5/1968 | Matson | |
| 3,619,009 | A | * | 11/1971 | O'Leary | 299/105 |
| D235,965 | S | * | 7/1975 | Grinnell et al. | D32/49 |
| 3,947,140 | A | * | 3/1976 | Thomas | 403/108 |
| 5,125,130 | A | * | 6/1992 | Stanish | 16/430 |
| 5,165,144 | A | * | 11/1992 | Nisenbaum | 16/421 |
| 5,272,788 | A | * | 12/1993 | Gilstrap | 16/422 |
| 5,452,767 | A | * | 9/1995 | Smotherman | 172/25 |
| 5,671,814 | A | | 9/1997 | Smith | |
| 5,769,279 | A | | 6/1998 | Smrt | |
| 5,791,006 | A | * | 8/1998 | Anctil | 15/144.4 |
| 5,799,996 | A | * | 9/1998 | Fredrickson | 294/51 |
| D408,126 | S | * | 4/1999 | Hunnicutt et al. | D3/7 |
| 5,988,296 | A | | 11/1999 | Zachman et al. | |
| 6,073,328 | A | * | 6/2000 | Hendricks | 29/270 |

(Continued)

*Primary Examiner* — Chuck Mah
(74) *Attorney, Agent, or Firm* — Absolute Technology Law Group, LLC

(57) ABSTRACT

An ergonomic earth-working device includes a horizontal handle having a grip with an outer grip, an inner grip and an inner grip interface. The outer grip's ribbed and contoured surface provides easy grasping, while the inner grip interface connects the grip and handle. The handle connects at one end to a curved upper portion having an arc angle. The curved upper portion also connects to an angled portion vertical portion with an angle offset. The angled vertical portion also connects to a vertical shaft, which is perpendicular to a ground plane and removably attaches to a contoured tool member. The configuration of the horizontal handle, curved upper portion, angled portion and vertical shaft, as well as the location of the grip on the horizontal handle, provide an ergonomic advantage allowing users to direct an earth-working force and the contoured tool member straight down rather than at an angle.

14 Claims, 4 Drawing Sheets

(56) References Cited

U.S. PATENT DOCUMENTS

| | | | |
|---|---|---|---|
| 6,148,483 A * | 11/2000 | DeGraff | 16/430 |
| 6,199,245 B1 * | 3/2001 | Blessing | 16/430 |
| 6,571,885 B2 | 6/2003 | Lee, Jr. et al. | |
| 6,695,172 B1 | 2/2004 | Porter | |
| D564,422 S * | 3/2008 | Harriss et al. | D12/133 |
| D632,069 S * | 2/2011 | Thiessens | D3/7 |
| 8,065,856 B2 | 11/2011 | Carrette | |
| D703,404 S * | 4/2014 | Murri | D32/40 |
| D721,213 S * | 1/2015 | Hamilton | D32/46 |
| 2003/0037399 A1 * | 2/2003 | Biggs | 15/257.2 |
| 2003/0131448 A1 * | 7/2003 | Dickhaus | 16/430 |
| 2003/0150478 A1 * | 8/2003 | Biggs | 134/6 |
| 2011/0099765 A1 * | 5/2011 | Youssefieh | 16/430 |

* cited by examiner

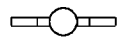
FIG. 2a
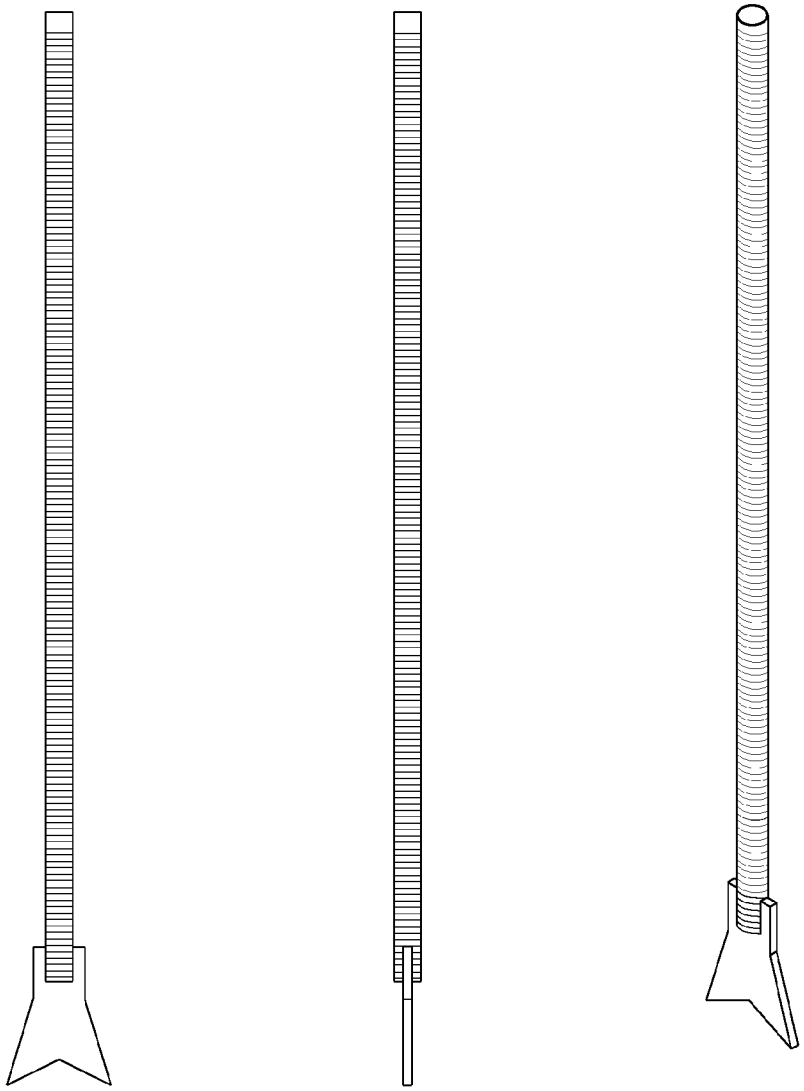
FIG. 2b  FIG. 2c  FIG. 2d

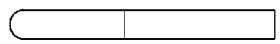
*FIG. 3a*
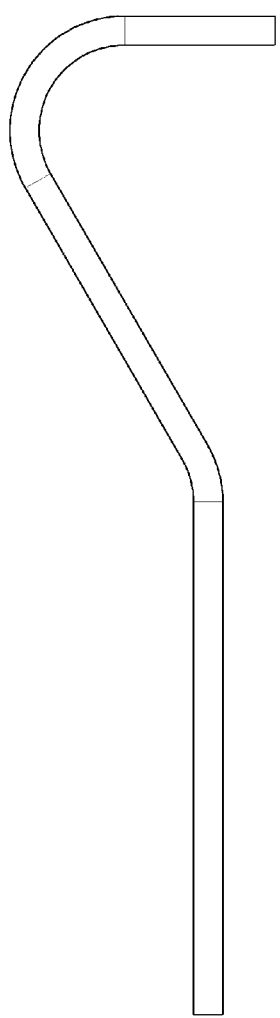 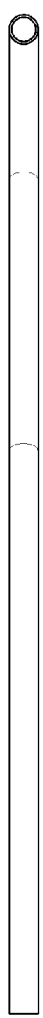 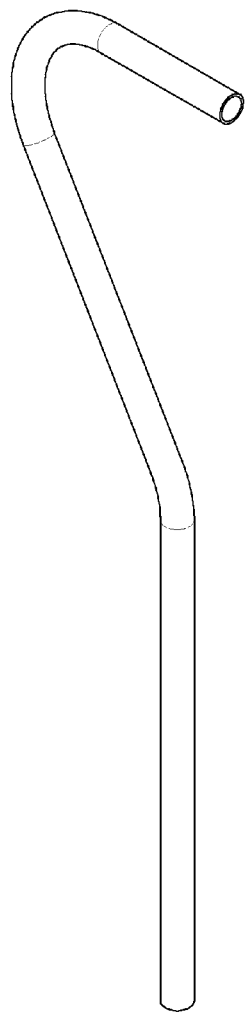
*FIG. 3b*  *FIG. 3c*  *FIG. 3d*

DROP AND DRIVE TOOL

CROSS-REFERENCE TO RELATED APPLICATIONS

This application claims priority to U.S. Provisional Application No. 61/892,812 filed on Oct. 18, 2013, which is hereby incorporated by reference in its entirety.

FIELD OF INVENTION

This invention relates to the field of earth working, and more specifically to a hand tool with a non-planar earthworking portion.

BACKGROUND

Utility companies must post warning signs along utility lines to prevent commercial excavators from severing gas, electricity or other vital utility lines. Alternately, these signs may guide the utility companies when they unearth utility lines for replacement or repair. Warning signs also prevent private property owners from accidentally and hazardously, perhaps even fatally, digging up utility lines located on their property.

Twenty states, as well as the District of Columbia, have laws requiring the posting of notification signs after application of a commercial pesticide to a lawn or other grounds. According to a 2004 survey by the National Gardening Association, 66 million U.S. households used chemical pesticides and/or fertilizers on their lawns and gardens. In 2003 alone, homeowners spent $38 billion on landscaping activities.

These warning and notification signs are small placards or flags attached to the ends of wires or thin posts. The most common method of posting these signs is to grasp the placard or flag end and manually push the opposite end of the sign into the ground. Because these signs are relatively short, a worker must bend over to post them. In one day, a landscaping or utility worker may be required to place hundreds of signs.

One-half of all working Americans admit to have back pain symptoms each year. Frequent bending, as might be experienced by a worker planting numerous signs, can worsen these symptoms. Furthermore, other activities can also aggravate back pain. In gardening and landscaping, frequent bending to till or aerate soil, dig holes for planting or dig trenches also exacerbates back pain. This pain may cause loss of working hours for professional landscapers or make every day gardening activities difficult for hobbyists.

It is desirable to have an ergonomic tool that can install signs quickly and easily, and does not cause back pain.

It is also desirable to have an ergonomic tool for gardening, landscaping and lawn care activities, which does not require a user to bend.

SUMMARY OF THE INVENTION

The present invention is a versatile, ergonomic tool device that allows planting an object or working the earth at a distance, eliminating the back pain caused by frequent bending. The ergonomic configuration of the grip allows a user to securely grasp the device. The relationship and configuration of the horizontal handle, curved upper portion, angled portion and vertical shaft, as well as the location of the grip on the horizontal handle, provide an ergonomic advantage in allowing a user to direct a planting or pushing force straight down rather than at an angle.

The device includes a horizontal handle having a grip, which allows easier grasping of the device. This grip has an outer grip with a ribbed and contoured surface, an inner grip and an inner grip interface, which connects the grip and handle. The handle connects at one end to a curved upper portion having an arc angle. The curved upper portion also connects to an angled portion vertical portion with an angle offset. The angled vertical portion in turn connects to a vertical shaft. This shaft is perpendicular to a ground plane at center and removably attaches to a contoured tool member.

While the contoured tool member may have numerous configurations, it most commonly take the form of a spike plate having at least two triangular spikes extending laterally therefrom, a spike with a pointed end, a shovel, an earthworking implement, or a gardening tool.

BRIEF DESCRIPTION OF THE DRAWINGS

FIGS. 2a-2d illustrate top, side, side and perspective views, respectively, of a contoured tool member.

FIGS. 3a-3d illustrate top, side, side and perspective views, respectively, of a horizontal handle, a curved upper portion, an angled portion and a vertical shaft of an ergonomic tool.

DETAILED DESCRIPTION OF INVENTION

Figure 1A:
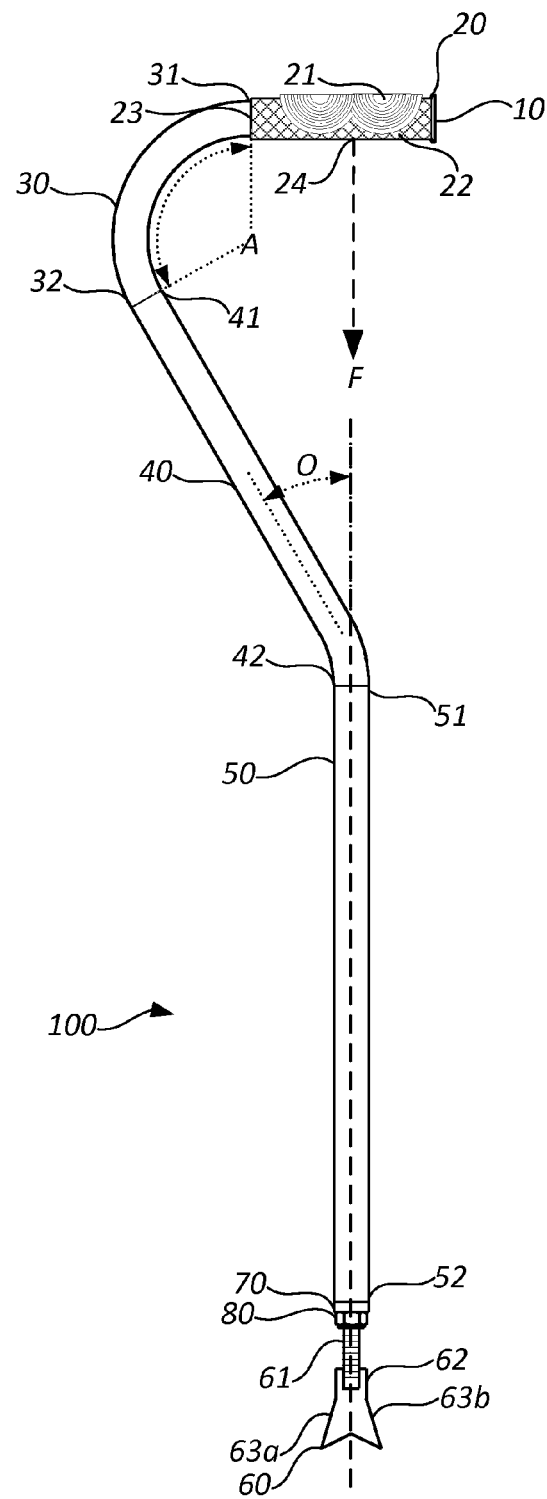
FIG. 1a illustrates a side view of an ergonomic tool.

For the purpose of promoting an understanding of the present invention, references are made in the text to exemplary embodiments of a tool, only some of which are described herein. It should be understood that no limitations on the scope of the invention are intended by describing these exemplary embodiments. One of ordinary skill in the art will readily appreciate that alternate but functionally equivalent elements may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale. Instead, emphasis has been placed upon illustrating the principles of the invention. Like reference numerals in the various drawings refer to identical or nearly identical structural elements.

Moreover, the terms "about," "substantially" or "approximately" as used herein may be applied to modify any quantitative representation that could permissibly vary without resulting in a change in the basic function to which it is related.

FIG. 1a illustrates a side view of an ergonomic tool 100. Ergonomic tool 100 includes a horizontal handle 10, a grip 20, a curved upper portion 30, an angled portion 40, a vertical shaft 50, a contoured tool member 60, an optional bushing 70 and an optional lock nut 80. Ergonomic tool 100 has an overall length of approximately 30 inches to approximately 72 inches long, not including contoured tool member 60. Shorter lengths are useful for workers standing on the ground, while longer lengths can be used by workers in vehicles.

In the exemplary embodiment, horizontal handle 10, curved upper portion 30, angled portion 40 and vertical shaft 50 are integral and made from a single length of an at least partially hollow tubular material. This hollow tubular material is critical to ergonomic tool 100, as it both reduces the weight of ergonomic tool 100 and allows adjustability of contoured tool member 60. The tubular material can be polymer, steel, aluminum or any other metal. The tubular material has an outer diameter of approximately 0.75 inches to approximately 2.5 inches. The tubular material has a wall thickness of approximately 0.0035 inches to approximately 0.925 inches.

Horizontal handle 10 has a length of approximately 3 inches to approximately 8 inches long. Grip 20 covers a majority of the outer surface of horizontal handle 10. Horizontal handle 10 attaches to curved upper portion 30.

Grip 20 allows easy grasping of horizontal handle 10. Grip 20 includes an outer grip 21, an inner grip 22, an inner grip interface 23 and a grip midpoint 24. Outer grip 20 has a ribbed and contoured surface, allowing a comfortable hold by a user, preventing grip 20 from slipping from the user's hand and cushioning the user's hold on horizontal handle 10, especially during repeated impacts in use. Inner grip 22 forms inner grip interface 23 with horizontal handle 10, preventing grip 20 from sliding off horizontal handle 10. In the exemplary embodiment, outer grip 21 and inner grip 22 are integral and molded from differently colored polymers, with different surface textures to guide a user's hand placement. In other embodiments, outer grip 21 and inner grip 22 may constitute different materials or separate pieces.

Grip 20 is located along horizontal handle 10 in a position placing grip midpoint 24 directly above a longitudinal axis of vertical shaft 50, shown in FIG. 1a as a dashed line. The positioning ensures that a force, shown in FIG. 1a as force arrow F, exerted by the user travels directly down vertical shaft 50. This line of force pushes contoured tool member 60 straight into the ground. If grip midpoint 24 was not directly above a longitudinal axis of vertical shaft 50, then force exerted by a user gripping horizontal handle 10 would instead push contoured tool member 60 into the ground at an angle. This would prevent contoured tool member 60 from reaching its maximum depth and may make it difficult for a user to push contoured tool member 60 through matted or heavy vegetation, or through packed or frozen earth or clay.

Curved upper portion 30 has an arc angle A of approximately 15 degrees to approximately 170 degrees. Curved upper portion 30 has a critical radius of curvature no greater than twice the length of horizontal handle 10, having a maximum value of approximately 6 inches to approximately 16 inches. A first curved upper portion end 31 of curved upper portion 30 attaches to horizontal handle 10. A second curved upper portion end 32 of curved upper portion 30 attaches to angled portion 40.

Angled portion 40 forms an angle offset O of approximately 5 degrees to approximately 80 degrees from vertical. A first angled portion end 41 of angled portion 40 attaches to curved upper portion 30. A second angled portion end 42 of angled portion 40 attaches to vertical shaft 50.

Vertical shaft 50 has a length of approximately 8 inches to approximately 58 inches long. A first vertical shaft end 51 of vertical shaft 50 attaches to second angled portion end 42. A second vertical shaft end 52 of vertical shaft 50 removably attaches to contoured tool member 60.

Contoured tool member 60 optionally includes an externally threaded shaft 61 inserted into second vertical shaft end 52. In the exemplary embodiment, externally threaded shaft 61 is threaded along at least 50% of its length, allowing significant height adjustment by rotating externally threaded shaft 61 to increase or decrease the distance between contoured tool member 60 and second vertical shaft end 52. In the exemplary embodiment, externally threaded shaft 61 connects to contoured tool member 60 by welding. In various contemplated embodiments, externally threaded shaft 61 connects to contoured tool member 60 by soldering, adhesives or integral manufacture. Externally threaded shaft 61 has a maximum length of approximately 10 inches.

In the exemplary embodiment of FIG. 1a, contoured tool member 60 constitutes a spike plate 62 having two lateral edges and at least two triangular spikes 63a and 63b extending therefrom. In the exemplary embodiment, each of triangular spikes 63a and 63b has at least one flat, non-tapering edge, preventing triangular spikes 63a and 63b from severing wires, posts or any other object they push into the ground. In the exemplary embodiment, the lateral angularity of each of triangular spikes 63a and 63b extends triangular spikes 63a and 63b at least partially beyond the lateral edges of spike plate 62. This wide spread of triangular spikes 63a and 63b makes targeting wires, posts or any other object easier.

In the exemplary embodiment of FIG. 1a, ergonomic tool 100 includes optional bushing 70. The embodiment shows bushing 70 at least partially inserted within second vertical shaft end 52. In this embodiment, bushing 70 has a first outer diameter equal to an outer diameter of vertical shaft 50 and a second outer diameter equal to an inner diameter of vertical shaft 50. Bushing 70 has internal threads that correspond to the threading of externally threaded shaft 61, allowing bushing 70 to interface with externally threaded shaft 61. In the exemplary embodiment, a length of externally threaded shaft 61 is longer than a length of bushing 70, allowing a very secure connection between bushing 70 and externally threaded shaft 61, as well as increased height adjustability. In one embodiment, bushing 70 is manufactured from a polymer and attached to vertical shaft 50 through adhesives or a pressfit. In another embodiment, bushing 70 is manufactured from a metal and attached to vertical shaft 50 through welding or soldering.

In the exemplary embodiment of FIG. 1a, ergonomic tool 100 also includes optional lock nut 80. Lock nut 80 is a hexagonal nut attached to bushing 70 and surrounding externally threaded shaft 61. Lock nut 80 maintains the extension of externally threaded shaft 61 by keeping it from rotating.

Figure 1B:
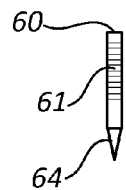
FIGS. 1b and 1c illustrate front views of alternate embodiments of a contoured tool member.
Figure 1C:
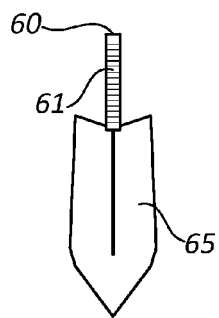

FIGS. 1b and 1c illustrate front views of alternate embodiments of contoured tool member 60. In the embodiments shown in FIGS. 1b and 1c, contoured tool member 60 constitutes a single, unangled spike 64 having a pointed end (FIG. 1b) or a shovel 65 (FIG. 1c). In still other various embodiments, contoured tool member 60 may be any other tool used for working earth, loose material or vegetation.

Figure 1D:
FIGS. 1d-1f illustrate top, perspective and side views, respectively, of an ergonomic tool.
Figure 1E:
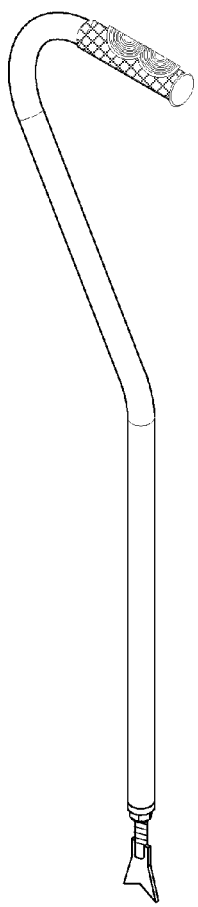
Figure 1F:

FIGS. 1d-1f illustrate top, perspective and side views, respectively, of ergonomic tool 100.

FIGS. 2a-2d illustrate top, side, side and perspective views, respectively, of contoured tool member 60.

FIGS. 3a-3d illustrate top, side, side and perspective views, respectively, of horizontal handle 10, curved upper portion 30, angled portion 40 and vertical shaft 50 of ergonomic tool 100. In the exemplary embodiment shown in FIGS. 3a-3d, horizontal handle 10, curved upper portion 30, angled portion 40 and vertical shaft 50 are integral and made from a single length of an at least partially hollow tubular material.

What is claimed is:

1. An ergonomic tool device for pushing objects into the ground, comprising:
   a horizontal handle having a grip, said grip having an outer grip, an inner grip and an inner grip interface, wherein said outer grip has a ribbed and contoured surface;
   a curved upper portion having an arc angle, wherein a first curved upper portion end of said curved upper portion is attached to said horizontal handle;

an angled portion forming an angle offset from vertical, wherein a first angled portion end of said angled portion is attached to a second curved upper portion end of said curved upper portion;

a vertical shaft perpendicular to a horizontal plane, wherein said vertical shaft is at least partially hollow, wherein a second angled portion end of said angled portion is attached to a first vertical shaft end of said vertical shaft;

a contoured tool member comprising a spike plate having two lateral edges and at least two triangular spikes extending therefrom, wherein each of said at least two triangular spikes has at least one flat, non-tapering edge, wherein each of said at least two triangular spikes are laterally angled to extend at least partially beyond said two lateral edges of said spike plate, wherein a second vertical shaft end of said vertical shaft is removably attached to said contoured tool member; and a bushing at least partially inserted into said second vertical shaft end, wherein said bushing is internally threaded, wherein a lock nut is attached to said bushing.

2. The device of claim 1, wherein said grip has a grip midpoint along a longitudinal axis of said grip, wherein said grip midpoint is located directly above a longitudinal axis of said vertical shaft.

3. The device of claim 1, wherein said arc angle is approximately 15 degrees to approximately 170 degrees.

4. The device of claim 1, wherein said angle offset is approximately 5 degrees to approximately 80 degrees from vertical.

5. The device of claim 1 wherein said bushing has a first outer diameter equal to an outer diameter of said vertical shaft, wherein said bushing has a second outer diameter equal to an inner diameter of said vertical shaft.

6. The device of claim 1, wherein said contoured tool member further comprises an externally threaded shaft inserted into said bushing and said lock nut.

7. The device of claim 6, wherein said externally threaded shaft is threaded along at least 50% of said shaft.

8. The device of claim 6, wherein a length of said externally threaded shaft is longer than a length of said bushing.

9. The device of claim 6, wherein said externally threaded shaft is welded to said contoured tool member.

10. The device of claim 1, further comprising an additional contoured tool member adapted to be exchangeable with said contoured tool member, wherein said additional contoured tool member comprises a spike having a pointed end.

11. The device of claim 1, further comprising an additional contoured tool member adapted to be exchangeable with said contoured tool member, wherein said additional contoured tool member comprises a shovel.

12. The device of claim 1, wherein said device has an overall length of approximately 30 inches to approximately 72 inches.

13. The device of claim 1, wherein said horizontal handle, said curved upper portion, said angled portion vertical portion and said vertical shaft are integrally constructed.

14. The device of claim 1, wherein said horizontal handle, said curved upper portion, said angled portion vertical portion and said vertical shaft are a single length of an at least partially hollow tubular material.

* * * * *